April 16, 1935.  C. J. BATH  1,997,672
RAM CONNECTION FOR BRAKES
Filed Jan. 2, 1932  2 Sheets-Sheet 1

Inventor
CYRIL J. BATH
Knox Hudson & Kent
attys.

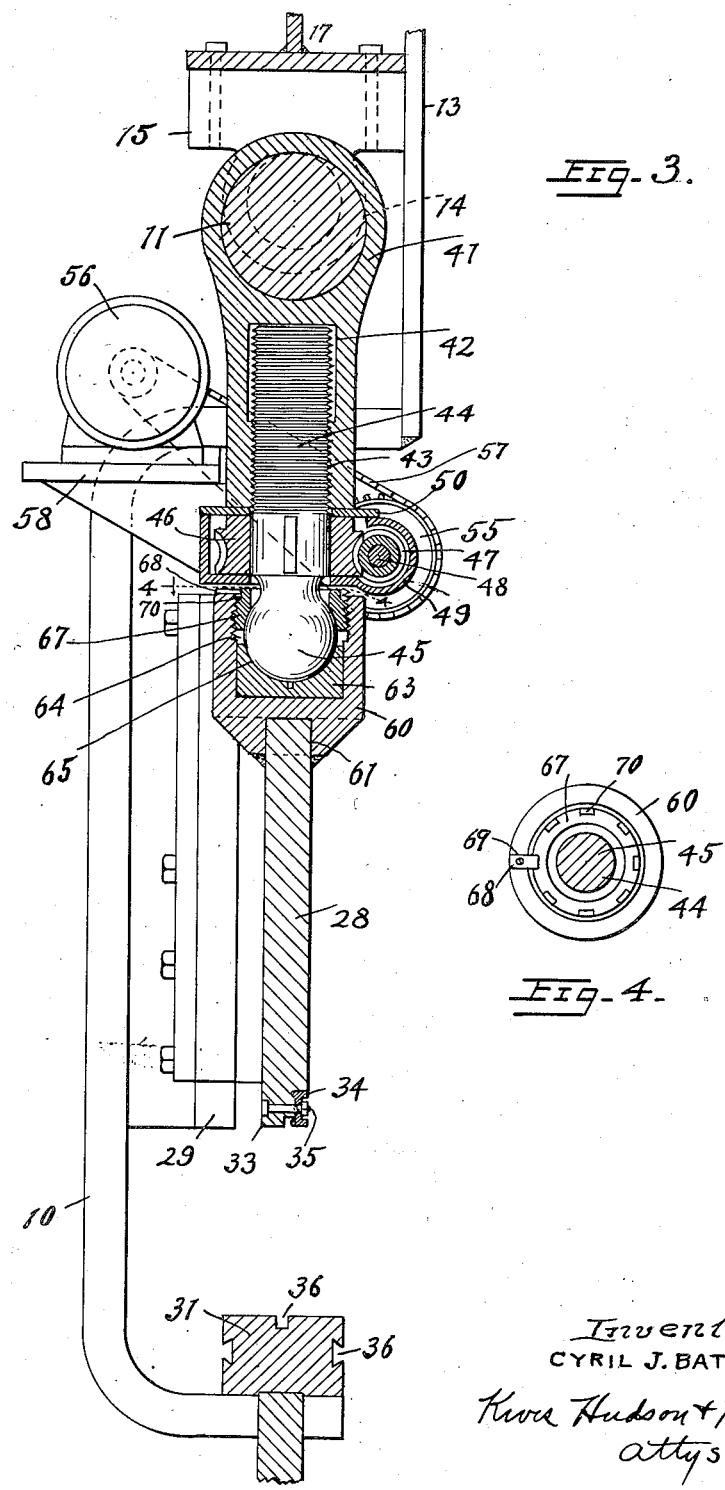

Patented Apr. 16, 1935

1,997,672

UNITED STATES PATENT OFFICE 1,997,672

RAM CONNECTION FOR BRAKES

Cyril J. Bath, Cleveland Heights, Ohio

Application January 2, 1932, Serial No. 584,358

1 Claim. (Cl. 153—21)

The present invention relates to a press brake and more particularly to the pitman connection operatively connecting the crankshaft and the ram and the pitman coupling connecting the pitman and the ram.

Machines of the general type referred to are used in bending and forming metal etc. and usually consist of a frame, a bed, a ram slidably supported on said frame, and a crankshaft and pitman for reciprocating said ram. In the prior art, difficulty has been experienced in providing a suitable coupling between the pitman and the ram and especially the connection on the ram.

An object of the invention is the provision of a novel pitman-coupling for connecting a pitman to the ram of a press brake which will be simple and rugged in construction and economical to manufacture.

Another object of the invention is the provision of a novel socket for a ball and socket coupling between the pitman and the ram of a press brake which will be inexpensive to build and assemble, and reliable in operation.

Another object of the invention is the provision of a novel socket for a ball and socket coupling between the pitman and the ram of a press brake which can be constructed as a separate unit and welded or otherwise secured to the ram.

Other objects and advantages of the invention will be apparent to those skilled in the art from the following description of the preferred embodiment of the invention described with reference to the accompanying drawings, in which:

Fig. 3 is a sectional view taken on the line 3—3 of Fig. 1; and

Fig. 4 is a sectional view taken on the line 4—4 of Fig. 3.

Similar reference characters indicate corresponding parts throughout the several figures of the drawings.

Figure 1:
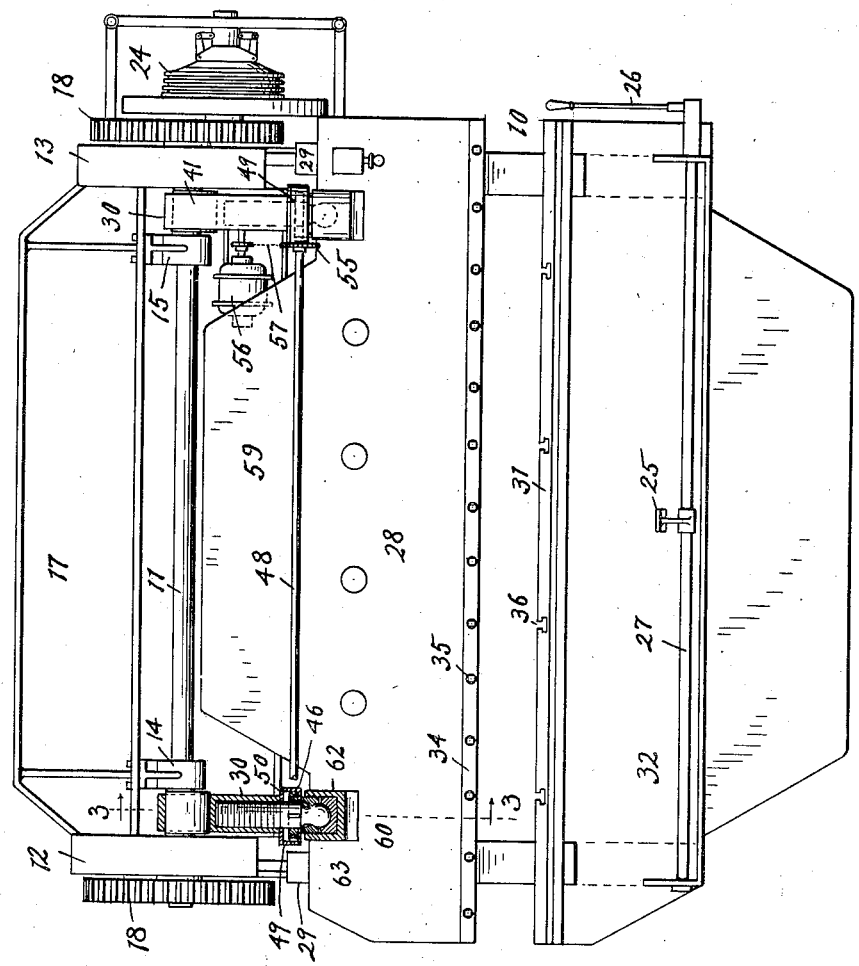
Figure 1 is a front elevational view of a press brake embodying the present invention.
Figure 2:
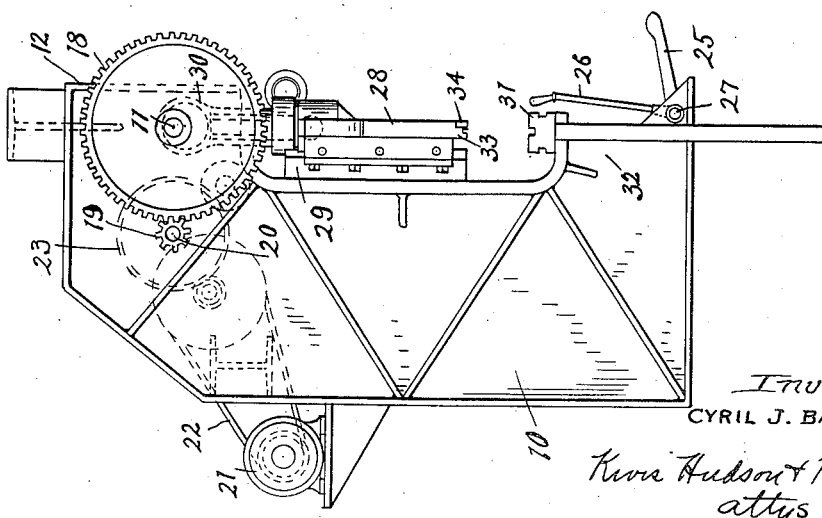
Fig. 2 is an end elevational view of the machine shown in Fig. 1 looking towards the right as viewed in Fig. 1.

Referring to the drawings, the frame of the machine is indicated in general by the reference character 10 and is preferably constructed of welded steel plates in a manner well known in the art. A crankshaft 11 is rotatably supported in suitable bearings formed in the end plates 12 and 13 of the frame 10 and hangers 14 and 15 supported by top plates 17 of the frame 10. The crankshaft 11 carries at opposite ends thereof bull gears 18 keyed thereto and continuously in mesh with pinions 19 fixed to a shaft 20 rotatably supported in suitable bearings in the frame 10. The shaft 20 is driven by an electric motor 21 through a belt 22, suitable gearing indicated in general by reference character 23, and a clutch 24. The clutch 24 is adapted to be operated by a foot pedal 25 or a hand lever 26 fixed to a shaft 27 rotatably supported in the frame 10 and operatively connected to the clutch 24 in a manner well known in the art.

A ram 28 slidably supported on suitable guides 29 on the front of the frame 10 is connected to the crankshaft 11 by means of a pair of pitmen 30 through which it is reciprocated towards and from a bed 31 supported on a knee 32 of the frame 10 as the crankshaft is rotated by the motor 21 etc. Suitable tools and/or dies, not shown, are adapted to be clamped to the ram 28 at the lower end thereof between a shoulder 33 formed integral with said ram and a bar 34 removably secured thereto as by the bolts 35. The bed 31 is provided with a plurality of T-slots 36 for the purpose of facilitating the clamping of work etc. thereto. The machine referred to may be used in a plurality of different metal work operations, such as shearing, bending or die pressing and the elements of the machine thus far described are well known in the art and may be found in a plurality of different embodiments. The novelty of applicant's invention relates primarily to the pitman construction and the coupling by which it is connected to the ram.

The pitmen 30 are identical in construction and comprise a pitman box 41 provided with an aperture 42 screw threaded near the lower end thereof as at 43. A bolt member 44 is threaded into the aperture 42 and provided at its lower end with a spherical shaped head 45. A worm wheel 46 keyed to the member 44 near the lower end thereof is in mesh with a worm wheel 47 fixed to a shaft 48 supported in bearings formed in a housing 49 which surrounds the worm and worm wheel. The housing 49 is provided with a cover plate 50 bolted or otherwise secured thereto. The shaft 48 carries near one end thereof a sprocket wheel 55 operatively connected to a reversible electric motor 56 through a sprocket chain 57. The motor 56 is supported at the rear of the ram 28 on a bracket 58 secured to the projection 59 of the ram 28. The construction is such that the electric motor 56 may be operated in either direction to rotate the members 44 and change the length of the pitmen to adjust the ram 28 relative to the base 31.

The socket for the spherical end 45 of the member 44 which completes the coupling between the pitman and the ram comprises a member 60 provided with a groove 61 on the bottom thereof welded into an opening 62 in the ram 28. A bearing member 63 of any suitable bearing material is positioned in the bottom of a rectangular aperture 64 in the member 60 and is provided with the hemispherical bearing surface 65 adapted to receive the lower end of the spherical head 45 of the member 44. A cap member 67 is threaded into the aperture 64 of the member 60 above the spherical head 45 and completes the socket of the ball and socket coupling between the pitman and the ram. A lock member 68 bolted or otherwise secured in a slot 69 in the top of the member 60 is adapted to project into slots 70 formed about the periphery of the member 67 and thereby lock the same in any adjusted position. The threaded engagement of the cap member 67 with the member 60 provides means for taking up wear etc. in the ball joint.

While the ball element of the ball and socket coupling shown is illustrated and described as being a part of the pitman, it is understood the ball and socket elements may be interchanged and the ball element carried by the ram instead of the socket element as described. The embodiment of the invention described and illustrated is merely a preferred form and I do not wish to be limited to the particular construction shown, which may be varied within the scope of this invention and I particularly point out and claim as my invention:

In a press brake, the combination of a frame, a ram composed of a rolled steel plate slidably supported by said frame, a shaft rotatably supported by said frame, eccentrics on said shaft, pitman members connected to said eccentrics for reciprocating said ram, and members engaging the upper edge of said ram and connected to said pitman members by ball and socket couplings, said last named members having channels in the lower sides thereof into which the upper edge of said ram projects and being secured to said ram by metal deposited along edges thereof.

CYRIL J. BATH.